Figure 2:
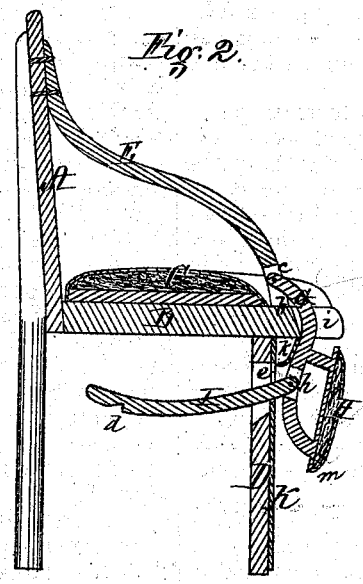

[20.] 2 Sheets--Sheet 1.
M. T. Glynn and J. L. Goodman's Seat for Horse Cars, etc.
No. 119,344. Patented Sep. 26, 1871.
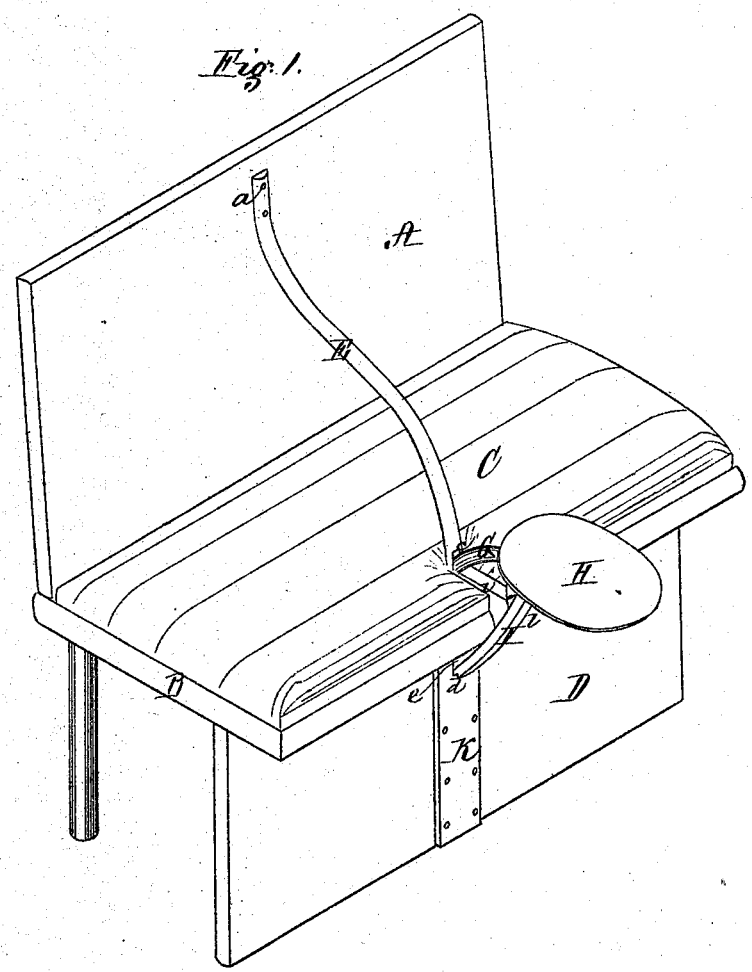
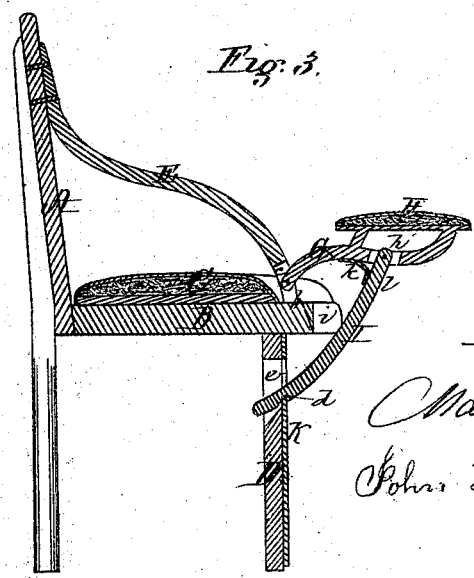

[20.]

M. T. Glynn and J. L. Goodman's Seat for Horse Cars, etc.

No. 119,344.

2 Sheets--Sheet 2.

Patented Sep. 26, 1871.

Witnesses,
N. W. Stearns
W. J. Cambridge

Martin T. Glynn
John L. Goodman

UNITED STATES PATENT OFFICE.

MARTIN T. GLYNN AND JOHN L. GOODMAN, OF BOSTON, MASSACHUSETTS.

IMPROVEMENT IN SEATS FOR HORSE-CARS.

Specification forming part of Letters Patent No. 119,344, dated September 26, 1871.

*To all whom it may concern:*

Be it known that we, MARTIN T. GLYNN and JOHN L. GOODMAN, both of Boston, in the county of Suffolk and State of Massachusetts, have invented certain Improvements in Seats for Horse-Cars, &c., of which the following is a full, clear, and exact description, reference being had to the accompanying drawing making part of this specification, in which—

Figure 1 is a perspective view illustrating our invention. Figs. 2 and 3 are vertical sections.

Our invention consists in so dividing the space for the seats of horse-cars that the required room for one individual may be partitioned off or separated from that of another, in order that each passenger may occupy the allotted space he is entitled to, whereby the inconvenience and confusion incident to the old construction are avoided, and the number of passengers limited to the capacity of the car; and our invention also consists in an auxiliary seat, which is so pivoted that it may be readily swung up into a position for use by a passenger, and when not required may be dropped down under the ordinary seats out of the way.

To enable others skilled in the art to understand and use our invention, we will proceed to describe the manner in which we have carried it out.

In the said drawing, A is the upright portion of one of the longitudinal sides forming the back of one of the seats of a car; B, the horizontal portion covered by the cushion C; and D the upright portion, extending from the floor of the car to the under side of the seat. E is one of a series of curved rods placed at equal distances apart, say about fifteen inches, which is about the space usually occupied by a passenger when sitting, the upper end of the rod E being secured at *a* to the back A of the seat, while the lower end of the rod is secured at *b* to the horizontal portion or bottom B of the seat, by which arrangement each side used in seating passengers is divided into the exact number of spaces corresponding to the number of passengers which the car is intended to accommodate, each seat being separate from and independent of the other. The lower end of the rod E, where it is secured to the horizontal portion or bottom of the seat, is bifurcated, as seen in Fig. 1, an opening, *c*, being thus formed in which to pivot one end of a bent arm, G, to the other end of which is secured a small auxiliary oval seat, H, which, when thrown up into a horizontal position ready for use, is supported by a brace, I, the lower end of which is provided with a notch, *d*, which catches over the edge of a slot, *e*, formed in a vertical metal strip or plate, K, attached thereunder to the upright portion D, the brace I being pivoted at *h* to the arm G, and a slot or recess, *i*, being formed in the front of the portion B in order that the arm G may be free to play therein when the seat is raised or lowered. *k* is a spring, one end of which is secured to the under side of the arm G, the opposite end bearing against the brace I to assist in keeping the notch *d* in place.

When the seat is up and is not required for use, it is simply necessary to exert a slight pressure on the outside of the brace I, near the point *l*, when the notched end *d* will be liberated from its catch, and the seat is free to swing down under the front of the seat out of the way. When the seat is down and is to be occupied, it may be readily raised by applying the hand to the lower or outer edge *m* until the notched end *d* of the brace falls over the edge of the slotted plate K.

Our invention may be readily applied to horse-cars generally, no particular change in the construction of the parts being required, excepting cutting the recesses *i* in the front of the seat, and adding the slotted plate K, the cost of the division-rod E and the swinging seat being about all the additional expense incurred, by which arrangement the car is made to seat comfortably a number of passengers equal to its capacity, and each individual will occupy the amount of space allotted one seat, whereby the crowding and confusion incident to the present construction are avoided.

It is evident that the auxiliary seat H may be applied with advantage to ferry-boats.

What we claim as our invention, and desire to secure by Letters Patent, is—

A car-seat, H, supported by the arm G, which is pivoted to the arm of the main seat, and provided with the spring *k* and notched brace I pivoted to G and operating in a stop below the seat, as shown and described.

Witness our hands this 5th day of June, A. D. 1871.

MARTIN T. GLYNN.
JOHN L. GOODMAN.

Witnesses:
N. W. STEARNS,
W. J. CAMBRIDGE.